United States Patent
Watkins et al.

(10) Patent No.: US 8,518,262 B2
(45) Date of Patent: Aug. 27, 2013

(54) METHOD OF INTEGRATING WATER TREATMENT ASSEMBLIES

(75) Inventors: Scott Watkins, Glenwood, IL (US); Raymond Perdue, Glenwood, IL (US)

(73) Assignee: Nalco Company, Naperville, IL (US)

( * ) Notice: Subject to any disclaimer, the term of this patent is extended or adjusted under 35 U.S.C. 154(b) by 213 days.

(21) Appl. No.: 11/687,482

(22) Filed: Mar. 16, 2007

(65) Prior Publication Data
US 2007/0215546 A1 Sep. 20, 2007

Related U.S. Application Data

(60) Provisional application No. 60/783,710, filed on Mar. 17, 2006.

(51) Int. Cl.
*B01D 61/12* (2006.01)

(52) U.S. Cl.
USPC .......... 210/652; 210/662; 210/663; 210/806; 210/97; 210/108; 210/142; 210/257.2; 210/739; 210/746; 210/741; 210/85; 210/321.65; 210/418

(58) Field of Classification Search
None
See application file for complete search history.

(56) References Cited

U.S. PATENT DOCUMENTS

| | | | |
|---|---|---|---|
| D222,252 S | 10/1971 | Coleman et al. | D23/205 |
| D222,254 S | 10/1971 | Kattlemann et al. | D23/205 |
| 4,764,271 A | 8/1988 | Acosta | |
| 4,787,980 A | 11/1988 | Ackermann et al. | |
| D347,257 S | 5/1994 | McGrew, Jr. | D23/202 |
| 5,547,584 A | 8/1996 | Capehart | |
| 5,817,231 A * | 10/1998 | Souza | 210/96.2 |
| D415,553 S | 10/1999 | Wolfe | D23/202 |
| D418,196 S | 12/1999 | Faltys et al. | D23/202 |
| 6,074,551 A * | 6/2000 | Jones et al. | 210/106 |
| 6,303,024 B1 * | 10/2001 | Kruchowy et al. | 210/102 |
| 6,607,668 B2 | 8/2003 | Rela | |
| 6,773,588 B2 * | 8/2004 | Beeman et al. | 210/232 |
| 6,863,822 B2 | 3/2005 | Pipes | |
| 2003/0168389 A1 * | 9/2003 | Astle et al. | 210/85 |
| 2005/0263457 A1 | 12/2005 | Wilkins et al. | |
| 2006/0131219 A1 * | 6/2006 | Chang | 210/85 |
| 2007/0090059 A1 * | 4/2007 | Plummer et al. | 210/743 |
| 2007/0163965 A1 * | 7/2007 | Wolfe | 210/739 |
| 2008/0272033 A1 * | 11/2008 | Underwood et al. | 210/85 |
| 2008/0314807 A1 * | 12/2008 | Junghanns et al. | 210/85 |

OTHER PUBLICATIONS

Crossbow Industrial Water D1 EXPRESS[SM] Portable Exchange Mixbed Deionizer, Model J36M Product Description, available prior to Nov. 2008.
Crossbow Industrial Water D1 Express[SM] Portable Exchange Mixbed Deionizer, Model J42M Product Description, available prior to Nov. 2008.

* cited by examiner

*Primary Examiner* — Krishnan S Menon
(74) *Attorney, Agent, or Firm* — Edward O. Yonter; Andrew D. Sorensen

(57) ABSTRACT

A method of integrating individual water treatment assemblies into a seamless water treatment control system. A Reverse Osmosis assembly contains a controller wherein all other pretreatment and post-treatment assemblies are electrical coupled thereto. The controller is preprogrammed for use in recognizing the coupling of the pretreatment and/or post treatment assemblies wherein and for receiving all control commands for operation thereof. The controller employs cells that allows and installer to interconnect assemblies by coupling low voltage control signal wiring having predefined inputs, set up as PnP, or by use of a personal wireless network.

25 Claims, 3 Drawing Sheets

METHOD OF INTEGRATING WATER TREATMENT ASSEMBLIES

RELATED APPLICATIONS

This application claims the priority filing date of U.S. Provisional Application No. 60/783,710 filed Mar. 17, 2006 the contents of which is incorporated by reference.

FIELD OF THE INVENTION

This invention is directed to water treatment systems and in particular to a method of integrating individual water treatment assemblies to provide a unitary water treatment system.

BACKGROUND OF THE INVENTION

Conventionally, water treatment systems are formed from a plurality of individual water treatment components that are fluidly and electrically coupled together for conditioning water to meet a particular requirement. For instance, a water treatment system is a term coined for a system capable of converting sea water to drinking water by use of various water treatment components. The term may also be used to define a system that converts water from a municipal water supply for use in rinsing semi-conductor chips, production of water for bottling or cola make-up, boiler water, or any other use of water that requires treatment to meet a particular requirement.

Water treatment components used to create water treatment systems vary due to the wide variety of water contaminants and the needs of the individual user. For instance, well water may have calcium carbonate hardness that is best treated by an ion-exchange resin, commonly referred to as a water softener. If iron is present, the type of iron whether it be soluble, bacterial, and/or organic bound, must be addressed to prevent fouling of the ion-exchange resin.

Turbidity and sediment found in surface water supplies require filtration, which may need to be pretreated with aeration and clarification that may further require coagulants. Excessively high levels of chlorine may require oxidation or removal by passage through an activated carbon bed.

Reverse Osmosis (RO) units have become a mainstay in water treatment systems as they are capable of removing over 95% of the dissolved solids in a raw water and be sized to provide throughputs as high as several million gallons of water a day. For this reason, pretreatment components are typically sized to protect the Reverse Osmosis membrane.

The Reverse Osmosis component further complicates the water treatment system by requiring pre-filters, booster and break tank pumps, ph and ORP monitors for regulating ph levels, bypass & auxiliary makeup valves, storage tanks, distribution pumps.

Integrated chip manufacturers demanding very high quality water require complex water treatment facilities such as Reverse Osmosis with waste and product flushing, followed by deionization systems having quality rinsing, filtration, recirculation, repressurization, holding tank holding tanks, such as portable exchange DI banks, high quality cells and so forth to the water treatment system.

As a result the complexity of water treatment systems continues to evolve wherein individual components that make up the system are directed to the particular water constituent that must be treated yet all such devices must work in conjunction for the water treatment system to operate properly. Conventionally, each water treatment component has a separate controller allowing the individual component unit to be placed in conjunction with a complimentary device sized for particular flow rate and designed to treat a particular water contaminant. For instance, a conventional water softener requires additional pump components such as timers, brine makers, chemical feeders, flow meters, totalizer meters, and control regeneration cycles. However, when a water softener is used in conjunction with a Reverse Osmosis unit, the Reverse Osmosis unit is designed to run at a fixed rate and cannot operate without the water softener, thus the water softener must be subservient to the Reverse Osmosis unit. The interconnection requires a trained technician to set the regeneration times, interface with the Reverse Osmosis unit to prevent operation during regeneration, programing of the softener clock to the totalizer, and so forth.

Similarly, a filtration system placed before the water softener may operate on a flow totalizer or pressure differentiation which also needs regeneration or what is known as, backwashing. The filtration system may require sanitization, include air input for scouring, chemical pumps for coagulants, chlorine or other chemical. The filtration system must be coordinated with the Reverse Osmosis unit to prevent backwash when the Reverse Osmosis is running, as well as coordinate with the water softener to prevent backwash while the softer is regenerating. To provide continuous flow, the filter and softeners may be duplexed but still must be coordinated to work together.

An activated carbon filter may be inline with the filtration unit and the softener unit, and again must be coordinated so that backwashing does not occur when the RO, softener, or filtration system is in a regeneration mode.

The result is an array of components that is chosen for the particular water supply yet individually customized as necessary for proper flow rates and contaminant removal, as the most efficient operational level. The installation of which becomes most difficult requiring trained technicians as the interface of the separate components must take place to prevent one component from operating while another is in regeneration or when storage tanks are full, or when quality drops, and so forth, a mistake of which can lead to catastrophic consequences.

Communication between water treatment components has traditionally been very time and labor intensive to coordinate. The initial setup of the water treatment system required a trained technician, and in many cases an electrician, to visit field installations for purposes of configuring the water treatment system. Due to individual water treatment component operation, high voltages wiring were commonly interfaced between individual water treatment components requiring local codes and regulations to be observed. Rework would be common if the voltage system did not conform to code and, in many cases, personnel that may otherwise be unfamiliar with water treatment system would need to be retained for purposes of the interconnecting. The associated expense of the circuit breaker panels in separate electrical lines further added to the expense of installation.

Prior art patents, such as U.S. Pat. No. 4,787,980 are directed to whole system monitoring of liquids by directing samples to one or more analytical instruments.

U.S. Pat. No. 6,863,822 discloses a parallel desalting method based on reverse osmosis, and the attempts at controlling pretreatment components.

U.S. Pat. No. 6,607,668 discloses a water purification system having a electrodeionization module which illustrates conventional art and the attempts at controlling pretreatment components.

U.S. Pat. No. 5,547,584 discloses a transportable water purification system employing a programmable logic controller. The logic controller operating individual components illustrating a redundancy of operating control and need to interface smart controllers with a logic controller.

Thus, what is lacking in the art is the ability to easily interface water treatment components into a water treatment system by use of a interfacing integrator to provide proper instructions and communication with the remaining components.

SUMMARY OF THE INVENTION

The instant invention is a method of integrating water treatment components into a seamless water treatment control system. In the preferred embodiment, the use of a Reverse Osmosis assembly is the master controller wherein all other pretreatment and post-treatment devices are electrical coupled thereto. The master controller employs cells that allow for the installer to easily interconnect various components by coupling low voltage control signal wiring from each water treatment component to the master controller. By way of example, a water softener for use in the instant invention includes the tank, resin, and piping, and valves while the actual control of the valves for directing service flow, backwash, brine, regeneration and rinse is provided by the master controller.

Preferably the master controller is mounted on the Reverse Osmosis assembly allowing the water treatment system to be designed around the Reverse Osmosis assembly. In this manner, no timers or totalizers are necessary on the softener, media filters, carbon filters, pre-filter and so forth. The master controller can either be pre-wired to understand the receipt of individual water treatment components. In the preferred embodiment, information from each water treatment component is stored on a locally mounted information chip to direct information to the master controller as to equipment size, type, capacity, and so forth providing the master controller an ability to calculate service periods at the appropriate time intervals providing ease of installation, efficiency in manufacturing, and efficiency in operation.

Accordingly, it is an objective of the instant invention to provide a master control system capable of recognizing and controlling all individual water treatment components to provide a seamless water treatment system.

It is a further objective of the instant invention to eliminate the cost of individual controllers located on individual water treatment components, eliminate the need for multiple flow, totalizer, and reset meters, reduce the cost of installation and integrated system diagnostics and historical date, reduce service costs.

It is yet another objective of the instant invention is to eliminate the need for technician interfacing between individual water treatment components.

Still another objective of the instant invention is to teach use of a Reverse Osmosis assembly as a master controller, said master controller capable of standardized interface that allows for coupling from an individual water treatment component directly to the master controller.

It is a still further objective of the invention is to provide an information chip on each individual water treatment component that includes identification material including, but limited to, valve type, pipe inlets and outlets sizes, flow rates, backwash/regeneration data, media type and date of manufacture, tank material and lining, temperature range, pH range, chlorine range, and the like information.

Another objective of the invention is to teach the use of a memory chip mounted on individual water treatment components that provide a master controller instant recognition of all operating characteristics of the component to confirm proper sizing for the installation based on pre-programmed parameters.

Still another objective of the instant invention is to reduce the amount of installation time and technical personnel otherwise necessary for component interfacing.

Another objective of the invention is to provide interfacing with low voltage cabling for use with control valves, eliminating the need for a special wire harnesses as required by electric codes for higher voltages.

Another objective of the instant invention is to employ wireless technology for interfacing of water treatment components with each water treatment component including an information chip that provides appropriate interface information by RF, such as Bluetooth, wherein the individual component would accept information direction from a master controller for operation of the component.

Still another objective of the invention is to provide seamless lead/lag or parallel Reverse Osmosisoperation.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE DRAWING

DETAILED DESCRIPTION OF THE PREFERRED ENVIRONMENT

Figure 1:
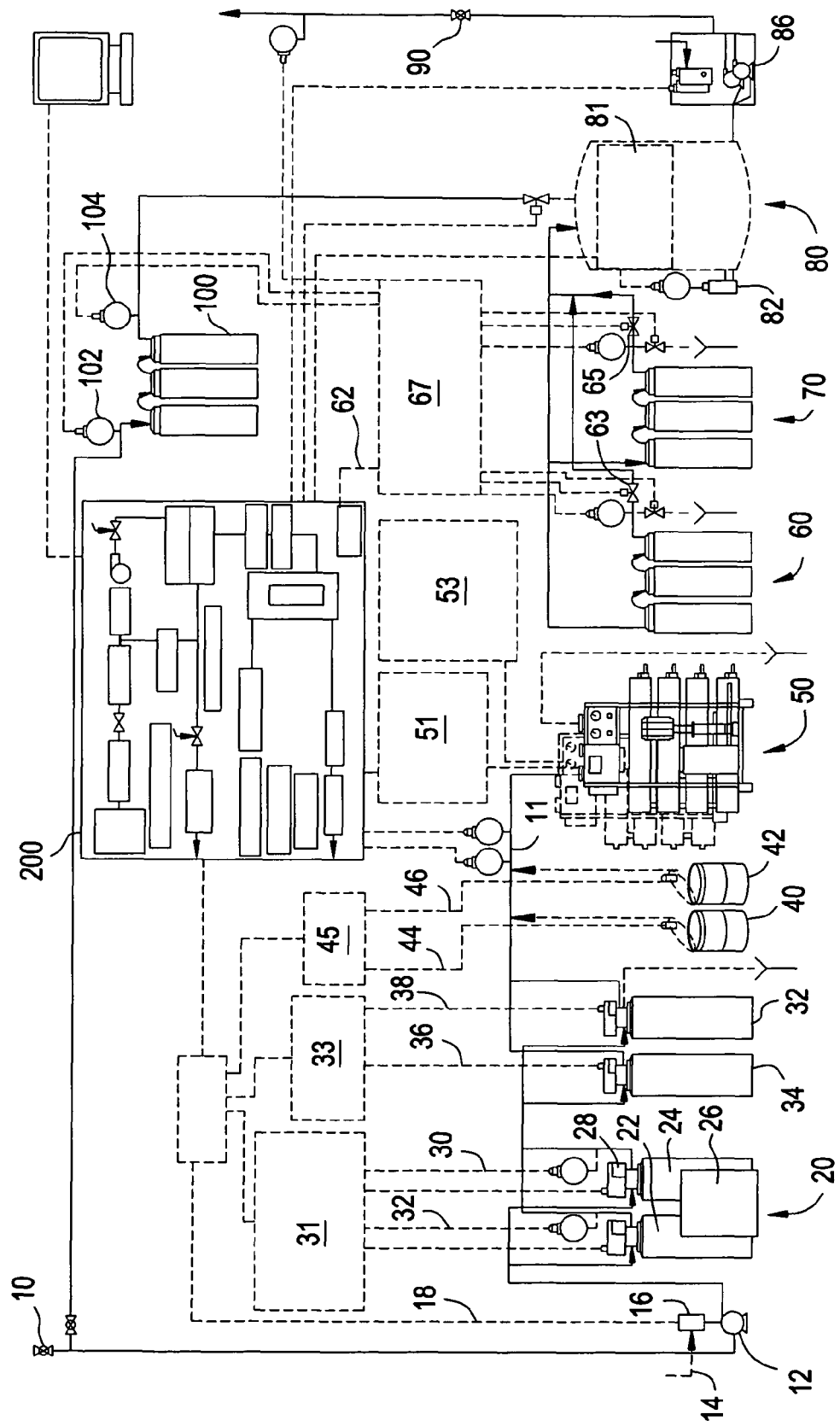
FIG. 1 is a pictorial flow diagram of a reverse osmosis de-ionization system having an integrated controller.

Now referring to FIG. 1, set forth is a pictorial flow diagram to illustrate the controlling interface of the instant invention. Set forth is feed water is inserted into the system the control valve 10 wherein an optional booster pump (12) is available for increasing the pressure of the feed water. The booster pump is typically powered by a 460 volt power source (14) coupled to a motor starter (16) that is interconnected to a control means, which operates as the master controller (200) by low voltage control signal cable (18). The control means (200) is understood to encompass any mechanical or electrical device effective for coordinating electrical power distribution (200). Preferably the master controller includes a programmable memory and a color touch screen HMI such as found in the Micrologiz 1200 Allen Bradley controller. The control means (200) indicates booster pump operation which may be used in conjunction with pre-treatment regeneration requirement. The LCD or touch screen control gives instantaneous status of all pretreatment and post treatment assembly operational status and flows, including feed water data and remote alarm contacts.

As an example, set forth is a duplex water softener (20) having first and second tanks (22, 24) and a brine tank (26). The controller for each water softener (28) is considered a dumb controller with a low voltage wiring to accept a control signal (30, 32) from the control means (200) providing an integration interface with a Reverse Osmosis assembly, as described later herein, to control regeneration times that compliment the Reverse Osmosis assembly. In a Reverse Osmosis assembly setting, a water softener is typically used to prevent premature scaling within the reverse osmosis membranes, the softeners are typically duplexed allowing for efficient operation of the Reverse Osmosis assembly. Carbon filter (32, 34) are shown placed in parallel again with the control signal cabling (36, 38) coupled to the control means (200). Carbon filters are typically used for removal of excess chlorine and, by way of example in this illustration, the carbon filters could be substituted for a multimedia filter for removing turbidity. A conventional pre-treatment system may include the use of acid injection for pH control, as indicated by control tank (40). A biocide (42) may be injected into the pre-treatment line (11). Both the acid and/or sodium bisulphite feeders are coupled to the control means (200) by control signal lines (44, 46) wherein operation of the pumps, including actual pulsation of the feeder motor, can be regulated to meet the needs of the Reverse Osmosis assembly. It should be noted that the signal lines can be replaced by wireless personal area networks, such as Bluetooth.

The reverse osmosis (RO) assembly (50) when used in combination with the other water treatment assemblies remains the most protected water treatment component and thus the RO needs the most protection from water contaminants by use of pretreatment equipment, i.e. water softeners, carbon filters, ph adjustment, and so forth. The Reverse Osmosis assembly (50) is focal point for this embodiment of the water treatment system wherein the control means (200) is designed to monitor and operate each of the pretreatment assembly for proper operation to extend the longevity of the Reverse Osmosis membranes. For instance, the Reverse Osmosis assembly includes a flow totalizer thereby eliminating the need for timers, flow meters, and/or flow totalizers on the water softeners (22, 24) causing regeneration upon demand of the reverse osmosis assembly. The control means (200) is programmed with the water constituents, such as calcium loading wherein the output of the amount of water utilized by the RO can be calculated to determine the most efficient time for softener regeneration. Further, the total dissolved content of the feed water, the flow rate of the feed water, the temperature of the feed water, cartridge filter pressure drops, membrane feed pressures, and the like are monitored and used to coordinate the most efficient periods for pretreatment assembly operations. Post treatment of the Reverse Osmosis includes monitoring and controlling based upon product flow rate, recycle flow rate, waste flow rate, product total dissolved solids, percent of recovery, percent of ejection, and includes product flushing if necessary.

The post treatment from the effluent of the Reverse Osmosis assembly (50) can be further polished by use of a deionization system as indicated by DI banks (60, 70). In this manner, the use of DI banks can be portable exchange with valving to maintain high quality interconnected to the control mean (200) which may allow for re-circulation polishing, startup water dump, and checks for conductivity/resistivity. The system controller (200) coupled by a controller signal (62) cable can be used to monitor water quality placed into a storage system (80) having a level indicator (82) and further provide indications to the controller (200) of tank levels, gallon draw rate, time left to empty the tank, time left to fill the tank, gallons remaining and so forth (81). From the storage system a distribution pump system (86) may be provided for distribution of the high quality RO/DI water to service (90). Control of the pump may include a duplex distribution pump control HOA. Shown in the illustration is a auxiliary makeup system (100) and may be found in reverse osmosis systems for system flushing wherein the totalizer (102) and conductivity monitor (104) is integrated to the control signal (62) and integrated into the system controller (200). The auxiliary makeup system control means is capable of identifying gallonage throughput, alerts or resets.

Figure 2A:
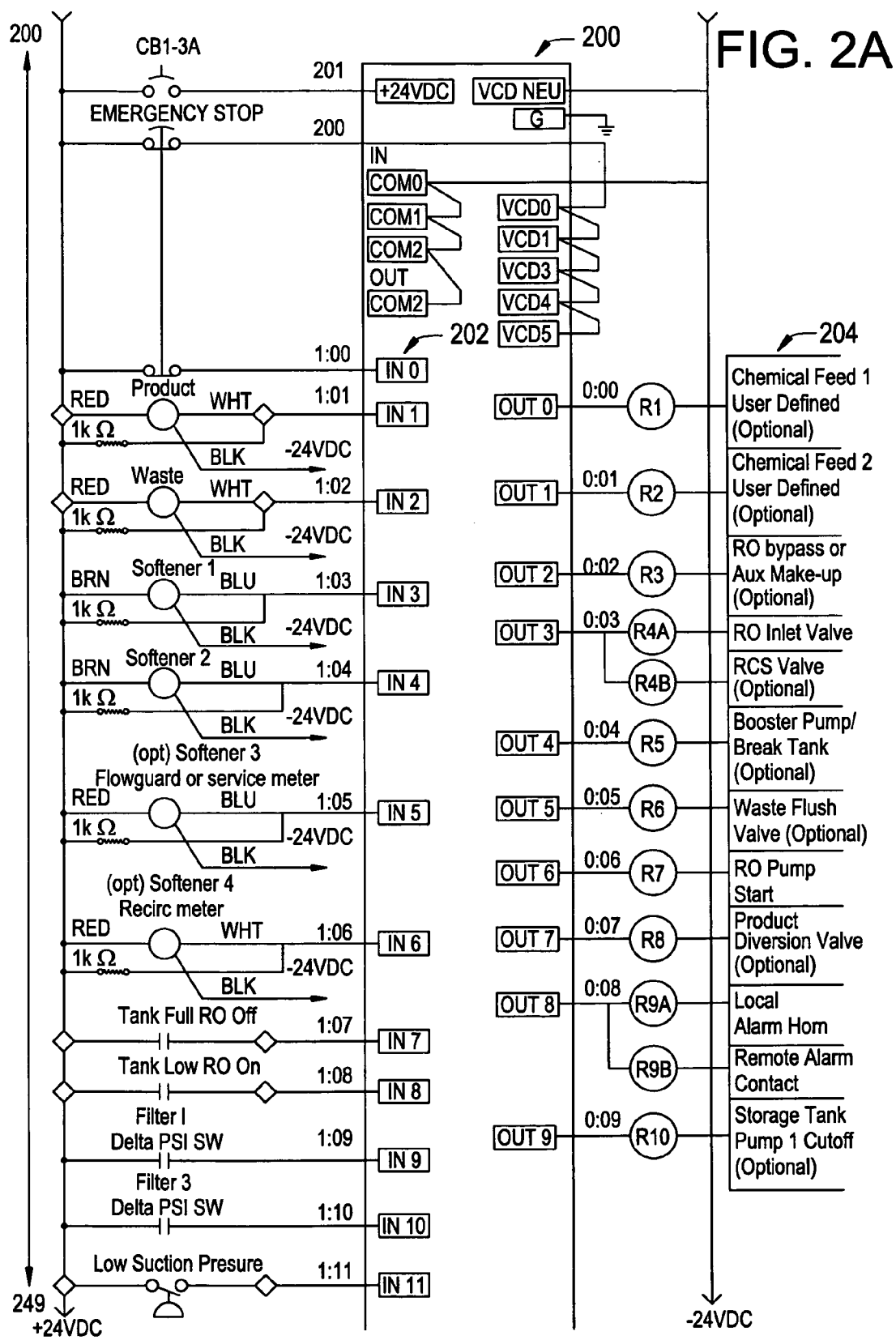
FIG. 2A is an electrical schematic of Reverse Osmosis assembly controller available for coupling to pretreatment components.
Figure 2B:
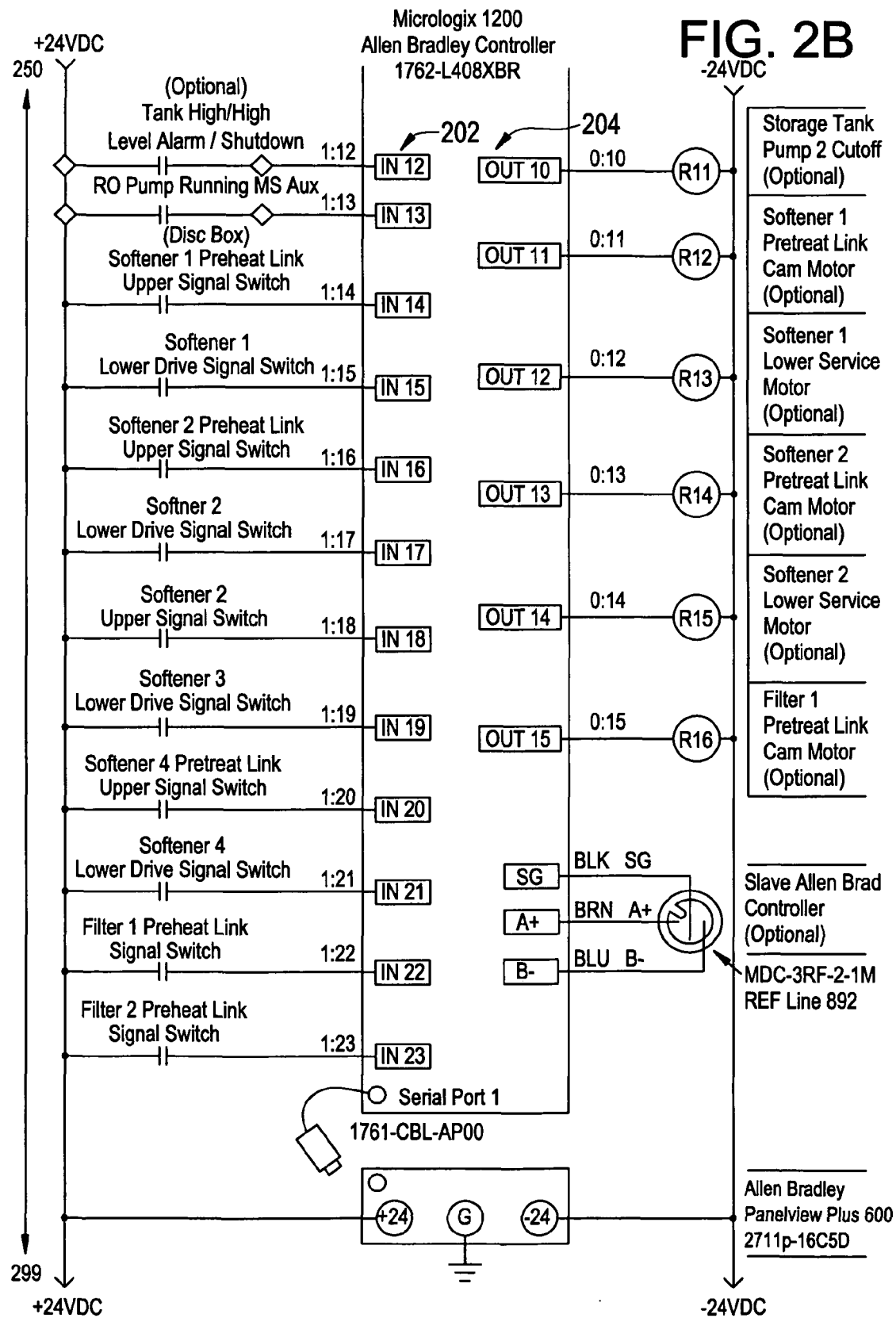
FIG. 2B is an electrical schematic of Reverse Osmosis assembly controller available for coupling to pretreatment components.

FIG. 2 is an electrical schematic of an Reverse Osmosis assembly controller available for coupling to pretreatment components. The schematic employs the use of the Mircrologix 1200 Allen Bradley Controller 1762-L40BXBR (200) having low voltage (24VDC) control to pretreatment components. In this embodiment, the controller is mounted in a reverse osmosis system and programmed for operation of the RO. The reverse osmosis system control panel can then by configured to accept all known types of pretreatment and post treatment, each assembly having a designated input (202) or output (204). While the pretreatment and post treatment assemblies can be made to recognize each assembly under a wireless configuration, such as the operating parameters which are characterized by model, valve type, valve size, and capacity. However, there are many installations where hard wire is preferred due to the bi-directional signaling wherein ancillary signals at the installation sight may cause signal corruption. For instance, some equipment rooms have unshielded wires wherein the use of radio frequency transfer may cause inappropriate signal loss.

The electrical schematic depicted illustrates the Allen Bradley Controller with all terminals prewired and designated for immediate connection. Low voltage is separated from the controller by use of signal switches and/or relays. As previously explained, the use of pretreatment assembly controllers is eliminated, thereby removing the use of cam which has been the mainstay of softener/filter control for the last 50 years. To assist those technicians that are familiar with troubleshoot using cam logic, the controller can be set up to display cam operation while the controller produces cam operation.

Electrically coupling between assemblies is low voltage for power distribution to control valve actuators thereby eliminating the need for electrical contractors.

The instant invention is best defined as a method of integrating water treatment components into a water treatment system by (a) providing at least one reverse osmosis assembly having a control means capable of managing an electrical power distribution system; (b) coupling at least one pretreatment assembly to said reverse osmosis assembly; (c) coupling at least one post treatment assembly to said reverse osmosis assembly; (d) configuring said control means to recognize each said pretreatment assembly; (e) configuring said control means to identify each said post treatment assembly; wherein said control means coordinate the electrical power distribution system requirement of said pretreatment and post treatment assemblies and said reverse osmosis assembly.

The method of integrating water treatment assemblies may also be automatic to facilitate operation of a reverse osmosis assembly, comprising: providing at least one reverse osmosis assembly having a control means; fluidly coupling of at least one water treatment assembly to said reverse osmosis assembly; electrically coupling said at least one water treatment assembly to said reverse osmosis assembly control means; said control means including a means for recognizing each said water treatment assembly; whereby said control means provides operational instructions to each said water treatment assembly. The reverse osmosis assembly 50 may be monitored for operational characteristics (51) including feed water TDS, feed gpm, fee temperature, cartridge filter, replacement alert, membrane feed psi, low psi shut down and auto restart.

Production characteristics (53) may include product gpm, product TDS, recycle gpm, waste gpm, Percent recovery, percent rejections, auto PRV, auto product flush, membrane and waste psi, and auto waste flush.

Each method allows at least one water softener to be electrically coupled to the control means. The control means is preprogrammed to permit power distribution to the softener to control regeneration based on water hardness as included in the water analysis inserted into the control means, and water quantity usage as identified by the controller. The controller (200) can be used to determine soft water usage, softener total capacity, softener capacity remaining, in service time remaining, service/standby, system settings, timers, salt consumption, time clock back-up and so forth (31)

Each method allows at least one booster pump electrically coupled to and thereby under control of said control means. The pretreatment assembly includes at least one back washable filter electrically coupled to and thereby under control of said control means. For instance, a carbon filter (34) may be back washed by differential pressure, gallonage data and/or time clock 33. At least one break tank may be made electrically coupled to the control means, wherein the control means controls fluid level in each break tank.

Chemical feeders are electrically coupled to and thereby under control of the control means. The control means capable of identifying chemical feed requirements by ph, ORP, gallonage data (45) or the like and using such information for controlling a feeder as well as providing real time reporting of the operation (200).

Unique to this invention is the ability to efficiently control various components by coordinating all water treatment assemblies. For instance, at least one storage tank can be coupled to the reverse osmosis assembly wherein the control means can be configured to (a) recognize the size of the storage tank; (b) identify the draw rate of the storage tank; (c) identify the time left to fill the storage tank; and (d) identify the time left to empty the storage tank. The water treatment system can then be optimized if the storage tank is to be the main control component, wherein the control means then controls fluid levels. The storage tank can further be graphically displayed to depict the draw rate, time left to fill the storage tank; and time left to empty the storage tank.

The post treatment assembly may include at least one bank of deionizer tanks having a bank switchover (63, 65) electrically coupled to the control means (200), the control means controlling power distribution to said bank switchover for selectively controlling fluid flow through each bank. The quality of the DI may be monitored under conductivity/resistivity, temperature or non-temperature compensated (67).

The control means graphically displays each pretreatment and post treatment assembly coupled to the reverse osmosis assembly and provides flow rates of each assembly, quality of reverse osmosis permeate, quality of deionizer tanks permeate.

The control means can be coupled to a network for communicating with a remotely located computer. The network may be an intranet, the Internet, or an Internet accessible web site. Alarm conditions may also be send via e-mail, text messaging, or the like should any assembly not meet predetermined parameters.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of integrating water treatment assemblies to facilitate operation of a reverse osmosis assembly, comprising:

providing at least one reverse osmosis assembly and a master controller;

fluidly coupling at least one water treatment assembly to said reverse osmosis assembly;

providing an information chip on the at least one water treatment assembly, the information chip storing identification information corresponding to operating characteristics of the at least one water treatment assembly;

connecting, on a wireless personal area network, said at least one water treatment assembly to said reverse osmosis assembly master controller;

said master controller monitoring and controlling said at least one water treatment assembly based upon operational characteristics of said reverse osmosis assembly, the master controller configured to receive the identification information and automatically recognize all operating characteristics of said at least one water treatment assembly upon the connecting of said at least one water treatment assembly;

whereby said master controller provides operational instructions to each said water treatment assembly based on the operational characteristics of said reverse osmosis assembly.

2. The method of claim 1, wherein said at least one water treatment assembly includes at least one water softener.

3. The method of claim 2, wherein upon recognition of said water softener, said master controller is preprogrammed to control regeneration based on water hardness and water quantity.

4. The method of claim 1, wherein said master controller is coupled to a network for communicating with a remotely located computer, (a) further comprising said remotely located computer receiving a graphic display and assembly operating characteristics from said master controller over said network, (b) further comprising said remotely located computer receiving a history of assembly operation from said master controller over said network, and (c) further comprising said remotely located computer transferring control parameters to said master controller over said network.

5. The method of claim 4, wherein the network comprises the wireless personal area network.

6. The method of claim 4, wherein the network comprises the internet.

7. The method of claim 4, wherein said network comprises an internet accessible web site.

8. The method of claim 4, wherein said graphic display including a step of directing at least one of said graphic display and said operating characteristics to an email server.

9. The method of claim 1, wherein said water treatment assembly includes at least one booster pump under control of said master controller.

10. The method of claim 1, wherein said water treatment assembly includes at least one back washable filter under control of said master controller.

11. The method of claim 1, wherein said water treatment assembly includes at least one break tank under control of said master controller, said master controller controlling fluid level in each said break tank.

12. The method of claim 1, wherein said water treatment assembly includes at least one chemical feeder under control of said master controller.

13. The method of claim 1, wherein water treatment assembly includes at least one storage tank.

14. The method of claim 1, wherein said water treatment assembly includes at least one distribution pump under control of said master controller.

15. The method of claim 1, wherein said post treatment assembly includes at least one hank of deionizer tanks having a bank switchover electrically coupled to said master controller, said master controller controlling said bank switchover for selectively controlling fluid flow through each said bank of deionizer tanks.

16. The method of claim 1, wherein said master controller graphically displays each of said at least one water treatment assemblies coupled to said reverse osmosis assembly on a graphic display.

17. The method of claim 16, wherein said graphic display displays at least one of flow rates, quality of reverse osmosis permeate, and quality of deionizer tanks permeate.

18. The method of claim 16, wherein said graphic display includes storage tank assembly levels including time for filling of said tank and time for emptying of said tank.

19. The method of claim 1, wherein a pre-programmed computer retrieves operating parameters from each of said at least one water treatment assemblies during assembly installation, said master controller operating each assembly for operational efficiency.

20. The method of claim 19, wherein said operating parameters are characterized by model, valve type, valve size, and capacity.

21. The method of claim 1, further comprising electrically coupling said at least one water treatment assembly to said reverse osmosis assembly master controller.

22. The method of claim 21, wherein said electrically coupling between assemblies is low voltage to control valve actuators and high voltage for control valves.

23. The method of claim 1, wherein said master controller includes configurable software running on a networkable computer.

24. The method of claim 1, wherein said master controller is preprogrammed to operate each said water treatment assembly.

25. The method of claim 1 wherein said master controller includes configurable software running on a networkable computer, said at least one water treatment assembly interfacing with said software.

* * * * *

UNITED STATES PATENT AND TRADEMARK OFFICE
CERTIFICATE OF CORRECTION

| | | |
|---|---|---|
| PATENT NO. | : 8,518,262 B2 | Page 1 of 1 |
| APPLICATION NO. | : 11/687482 | |
| DATED | : August 27, 2013 | |
| INVENTOR(S) | : Watkins et al. | |

It is certified that error appears in the above-identified patent and that said Letters Patent is hereby corrected as shown below:

In the claims,

Claim 15, column 9, line 36, the word "hank" should be --bank--.

Signed and Sealed this
Twenty-fourth Day of November, 2015

Michelle K. Lee
*Director of the United States Patent and Trademark Office*